(12) United States Patent
Tan

(10) Patent No.: US 12,643,656 B2
(45) Date of Patent: Jun. 2, 2026

(54) SYSTEM AND METHODS FOR CONTROLLING REMOTE ORDINACE DELIVERY

(71) Applicant: Cushybots Corporation, Havertown, PA (US)

(72) Inventor: Allen Dodgson Tan, Long Beach, CA (US)

( * ) Notice: Subject to any disclaimer, the term of this patent is extended or adjusted under 35 U.S.C. 154(b) by 0 days.

(21) Appl. No.: 18/806,048

(22) Filed: Aug. 15, 2024

(65) Prior Publication Data

US 2025/0058873 A1 Feb. 20, 2025

Related U.S. Application Data

(60) Provisional application No. 63/519,650, filed on Aug. 15, 2023.

(51) Int. Cl.
*B64D 1/06* (2006.01)
*F42C 15/42* (2006.01)
*B64U 101/18* (2023.01)

(52) U.S. Cl.
CPC .............. *B64D 1/06* (2013.01); *F42C 15/42* (2013.01); *B64U 2101/18* (2023.01)

(58) Field of Classification Search
CPC .... B64D 1/02; B64D 1/04; B64D 1/06; F42C 15/42; B64U 2101/18; B64U 2101/69
See application file for complete search history.

(56) References Cited

U.S. PATENT DOCUMENTS

| | | | | |
|---|---|---|---|---|
| 8,789,453 | B1 * | 7/2014 | Morrison | F41F 3/065 89/1.817 |
| 8,843,305 | B1 * | 9/2014 | Jacob | F42C 15/40 701/408 |
| 8,893,605 | B1 * | 11/2014 | Hester, Jr. | F41F 3/042 89/1.51 |
| 9,769,902 | B1 * | 9/2017 | Cain | F41G 1/00 |
| 10,501,185 | B2 * | 12/2019 | Kramer | B64D 1/16 |
| 10,710,719 | B1 * | 7/2020 | Lott, III | G01S 1/0423 |
| 11,136,121 | B1 * | 10/2021 | Kooiman | B64D 9/00 |
| 11,754,380 | B2 * | 9/2023 | Benson | F41A 21/36 89/37.16 |
| 11,840,340 | B2 * | 12/2023 | Yamato | B64C 1/22 |
| 11,987,403 | B2 * | 5/2024 | Luong | B64U 10/14 |
| 2017/0082397 | A1 * | 3/2017 | Hester, Jr. | F41G 7/2293 |
| 2018/0162527 | A1 * | 6/2018 | Hupp | F41G 9/002 |
| 2019/0367169 | A1 * | 12/2019 | O'Leary | F41A 27/08 |
| 2020/0023966 | A1 * | 1/2020 | Stephens | G05D 1/0038 |

(Continued)

FOREIGN PATENT DOCUMENTS

| | | | | | |
|---|---|---|---|---|---|
| CN | 105667794 | A | * | 6/2016 | B64D 1/04 |
| CN | 107514933 | A | * | 12/2017 | F41F 7/00 |

(Continued)

*Primary Examiner* — Benjamin P Lee
(74) *Attorney, Agent, or Firm* — Armstrong Teasdale, LLP

(57) ABSTRACT

A system for delivering ordinance is disclosed. The system includes a flight capable drone having a lift capacity suitable for carrying a munition, a fire control module in communication with the munition, and a handheld device in remote communication with the fire control module. At least one encrypted firing code generated by the fire control module is received by the handheld device and the munition is armed in accordance with at least the location of the drone.

15 Claims, 10 Drawing Sheets

100

120 150 130

110

160 102

(56)                    References Cited

U.S. PATENT DOCUMENTS

| | | | |
|---|---|---|---|
| 2020/0051438 A1* | 2/2020 | Magdaleno | G05D 1/0027 |
| 2020/0284566 A1* | 9/2020 | Viviani | F42B 12/382 |
| 2021/0253250 A1* | 8/2021 | Kim | B64D 1/04 |
| 2021/0309370 A1* | 10/2021 | Kooiman | E05F 15/605 |
| 2022/0212791 A1* | 7/2022 | Knab | F42D 3/00 |
| 2022/0274705 A1* | 9/2022 | Sly | B64D 1/04 |
| 2023/0271703 A1* | 8/2023 | Kilzer | G05D 1/101 |
| 2024/0239531 A1* | 7/2024 | Bitar | B64U 30/26 |
| 2025/0012550 A1* | 1/2025 | Porter | F42B 25/00 |
| 2025/0028335 A1* | 1/2025 | Liani | G05D 1/656 |

FOREIGN PATENT DOCUMENTS

| | | | | | |
|---|---|---|---|---|---|
| CN | 105963882 B | * | 3/2022 | | B64D 1/06 |
| ES | 2975937 A1 | * | 7/2024 | | B64U 50/13 |
| KR | 101195909 B1 | * | 11/2012 | | B64D 1/00 |
| KR | 114506453 A | * | 5/2022 | | B64C 39/024 |
| KR | 102526498 B1 | * | 4/2023 | | B64D 7/08 |
| KR | 2731291 B1 | * | 11/2024 | | A62C 3/025 |
| KR | 102731291 B1 | * | 11/2024 | | B64U 50/30 |
| WO | WO-2009104112 A2 | * | 8/2009 | | F42C 9/16 |
| WO | WO-2020253622 A1 | * | 12/2020 | | B64U 10/10 |
| WO | WO-2021046592 A1 | * | 3/2021 | | F41G 3/22 |
| WO | WO-2024191323 A1 | * | 9/2024 | | F42B 5/05 |

* cited by examiner

120

127

121

123

124

125

126

On Payload StA

122

160

162

161

163

164

169

170

165

171

166

167

168

800

120

Fire Control Module

Control Signals

122

Connector to Fire Control Module
(9 Pin)

Control Signal

Control Signal

Actuator,
Payload
Release

153

Fire
Laser
Signals

157

Laser

155

Connector to Munition
(9 Pin)

142

Munition

130

120

160

127

123

128

129

121

124

125

126

122

SYSTEM AND METHODS FOR CONTROLLING REMOTE ORDINACE DELIVERY

PRIORITY

This application claims the benefit of U.S. Provisional Patent Application No. 63/519,650, filed Aug. 15, 2013, which is incorporated by reference in its entirety.

FIELD OF THE INVENTION

The present invention relates to an ordinance delivery device, and, more particularly, to system and methods for controlling remote ordinance delivery.

BACKGROUND

Drones, also known as Unmanned Aerial Vehicles (UAVs), have become a significant technological advancement in modern warfare. Their use has expanded rapidly over the past few decades, offering various strategic and tactical advantages to military forces. Drones are employed in warfare for reconnaissance, surveillance, target acquisition, intelligence gathering, and even offensive operations. Drones are widely used for gathering real-time intelligence and providing a bird's-eye view of the battlefield. They can fly over hostile territories without risking human lives and transmit valuable data, including imagery, videos, and sensor readings, to military command centers. This information helps commanders assess enemy positions, troop movements, and terrain conditions.

Drones also play a crucial role in identifying and locating potential targets for strikes. By providing accurate and up-to-date information about enemy activities, they enable precise targeting of enemy assets such as vehicles, infrastructure, and personnel. Drones may be equipped with advanced sensors, cameras, and other surveillance equipment which can monitor communications, intercept electronic signals, and collect data from various sources. This information aids in understanding enemy capabilities, intentions, and potential threats.

Drones may also enhance the effectiveness of military forces by extending their reach, providing persistent surveillance, and relaying critical information in real-time. This allows commanders to make informed decisions and allocate resources more efficiently. The presence of drones can influence the psychological and emotional state of adversaries. The constant threat of drone strikes can instill fear and disrupt enemy operations, affecting their morale and decision-making.

Armed drones, also known as Unmanned Combat Aerial Vehicles (UCAVs), can carry and launch precision-guided munitions. They offer the advantage of highly accurate and controlled strikes, minimizing collateral damage and reducing the risk to friendly forces. Drones eliminate the need to put pilots or soldiers in harm's way, reducing casualties and the potential for prisoners of war. This remote and automated approach may allow for more controlled and calculated military actions.

What is needed is are UCAVs that are easy to use in the field and are reliably in communication with a user with improved delivery accuracy. While prior art solutions have allowed for the dropping of an object from a remote-controlled device, UCAVs still have yet to overcome issues with accuracy and reliability.

BRIEF SUMMARY

The present embodiments may relate to, inter alia, systems and methods for controlling remote ordinance delivery.

In an embodiment of the present invention a system for delivering ordinance, comprising a flight capable drone having a lift capacity suitable for carrying a munition, a fire control module in communication with the munition, a handheld device in remote communication with the fire control module, wherein at least one encrypted firing code generated by the fire control module is received by the handheld device, and wherein the munition is armed in accordance with at least the location of the drone.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION

Figure 1:
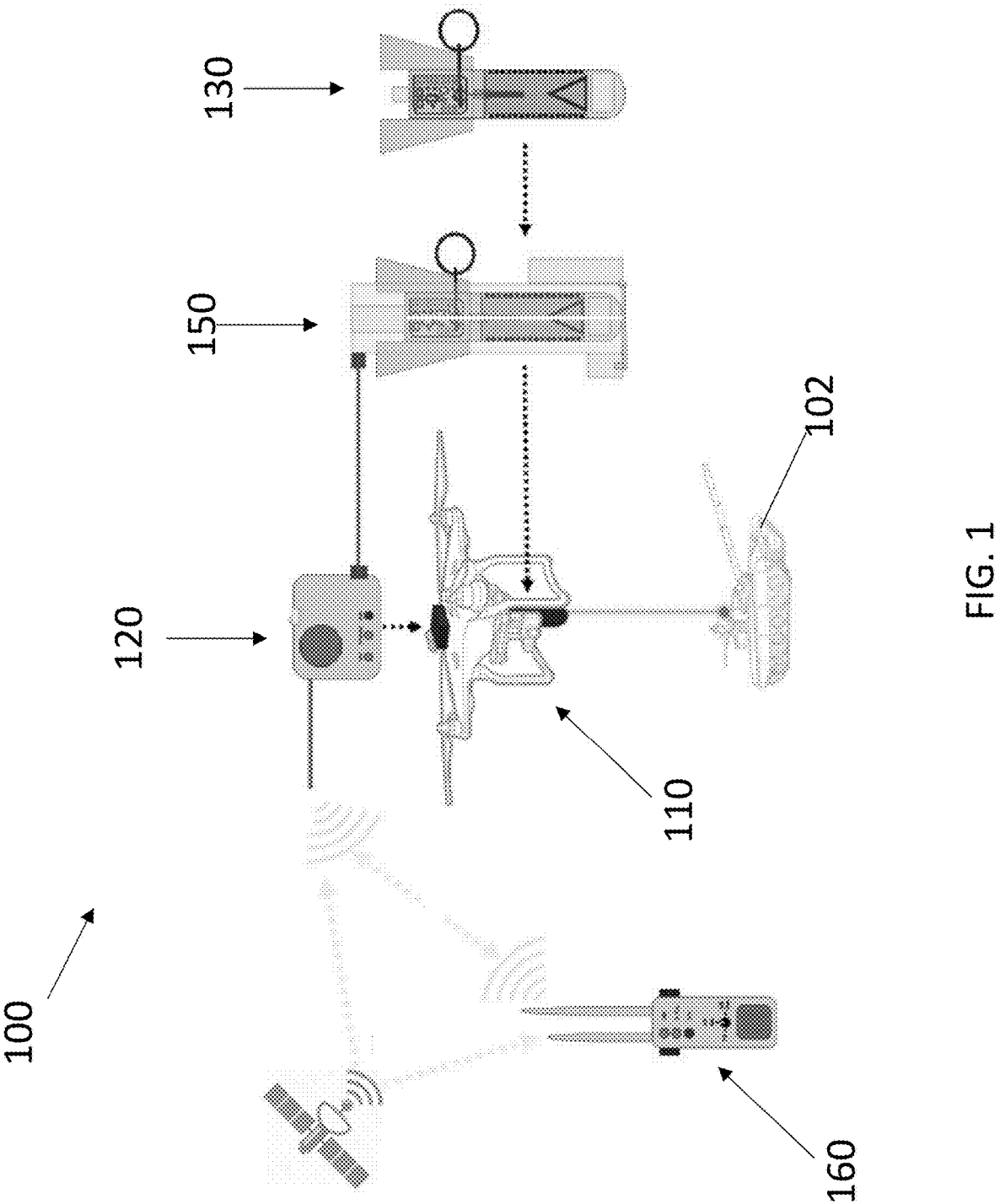
FIG. 1 is a schematic diagram of a Micro Dropped Attach Munition (MDAM) system in accordance with an embodiment of the present disclosure.

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing", "outputting", "generating", "receiving", "transmitting", "determining", "using" or the like, refer to the actions and processes of a computer system, or similar electronic device including UCAVs. The computer system or similar electronic computing device manipulates and transforms data represented as physical (electronic) quantities within the computer system's registers and memories into other data similarly represented as physical quantities within the computer system memories or registers or other such information storage, transmission, or display devices.

The present disclosure relates to a fire control mechanism of a remotely fired munition involving a set of processes and technologies that enable the remote initiation and control of the munition's launch or detonation. This mechanism allows operators to launch or trigger the munition from a safe distance, reducing the risk to personnel and providing greater tactical flexibility.

The system begins with a control center, which is a command and control station where operators monitor the battlefield, gather intelligence, and make decisions about when and where to deploy the munition. This center can be a vehicle, a command post, or a remote station.

A control center communicates with the munition using various communication methods, such as radio signals, satellite links, or secure networks. For example, a control center may communication with the munition via one or more radio frequency links or wireless communication channels, including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection. This communication link allows operators to transmit commands and receive feedback from the munition. Remotely fired munitions are often equipped with sensors, such as cameras, GPS, and laser rangefinders. These sensors help identify and track targets accurately. Operators use this data to select the target and determine the appropriate time for firing.

The operators program the munition's settings, such as the launch trajectory, desired impact point, and timing of the detonation. These settings are often input into the munition's guidance and control system via the communication link. Once the munition is armed and the settings are configured, operators can initiate the launch command remotely. This command is transmitted through the communication link to the munition's onboard control system. The munition's guidance and control system uses the programmed settings and sensor data to control its flight path. If the munition is guided, it can make mid-course adjustments to ensure it reaches the intended target accurately.

Depending on the type of munition and its intended purpose, operators can remotely trigger the munition's detonation at the desired moment. This can be achieved using a command to activate the munition's explosive mechanism. The control center receives feedback and status updates from the munition during its flight and upon detonation. This information helps operators assess the effectiveness of the strike and make real-time decisions if adjustments are needed.

Robust safety measures are often built into the fire control mechanism to prevent accidental or unauthorized launches. These measures may include authentication protocols, encryption, and fail-safes. After the mission is complete, operators can analyze the collected data, assess the results of the strike, and make informed decisions for future operations. The fire control mechanism of remotely fired munitions provides military forces with enhanced control, precision, and flexibility in engagements, enabling them to engage targets from a distance while minimizing risk to personnel and optimizing the use of resources.

FIG. 1 illustrates a Micro Dropped Attach Munition (MDAM) system 100 in accordance with an embodiment of the present disclosure. MDAM system includes an armed drone 110, also known as Unmanned Combat Aerial Vehicle (UCAV), and a fire control module 120. MDAM system 100 enables precise targeting of enemy assets such as vehicles 102, infrastructure, and personnel, as described in more detail below.

Fire control module 120 is configured to couple to or is integrated with drone 110. In one embodiment, drone 110 is a flight capable drone having a lift capacity suitable for carrying a munition 130. In one embodiment, drone 110 further includes a munition housing 150 for munition 130, as described in more detail below. In one embodiment, MDAM system 100 further includes a remote controller 160. Remote controller 160 is configured to communication with fire control module 120 via a communication link, such as a one or more radio frequency links or wireless communication channels, including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection.

Figure 2:
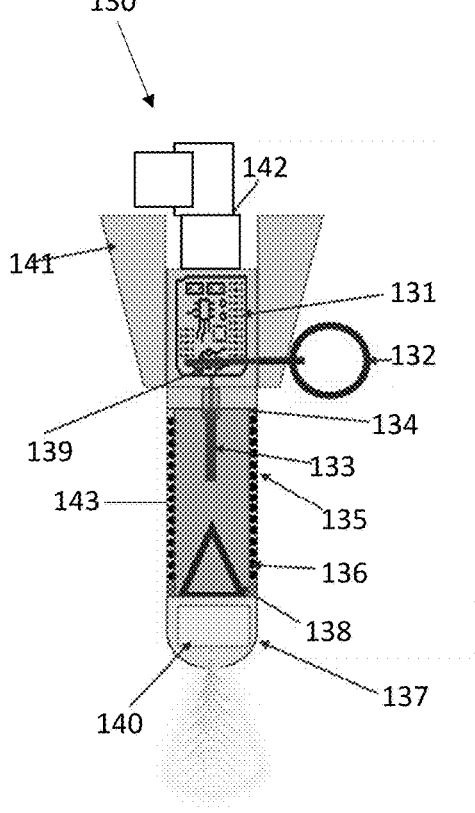
FIG. 2 is a diagram of a munition in accordance with an embodiment of the present disclosure.

FIG. 2 illustrates munition 130 which may be used with MDAM system 100 shown in FIG. 1. Munition 130 includes a microcontroller 131 configured to control one or more mechanisms of munition 130. For example, in one embodiment, microcontroller 131 is configured to control arming and firing of munition 130. Munition 130 further includes a shunting pin 132. In one embodiment, pin 132 is removed before drone 110 takes flight in order for munition 130 to fire. Munition 130 further includes a blasting cap 133 and a cap retention disk 134. In one embodiment blasting cap 133 comprises an M6 blasting cap. Cap retention disk 134 is configured to retain blasting cap 133. Munition further comprises a blasting cap retention screw fitting 139.

Munition 130 includes a body 143 include a sleeve 135. Sleeve 135 may include ball bearings 136 positioned within sleeve 135. In one embodiment, munition 130 incudes a nose 137 with a shaped charge 138. In one embodiment, such as the embodiment illustrated in FIG. 2, munition 130 includes a cone nose 137 with a cone shaped charge 138. As used here, the term "shaped charge" refers generally to an explosive charge shaped to focus the effect of the explosive's energy.

Munition 130 further includes one or more fins 141 configured to stabilize munition 130. Munition further includes a connector 143 configured to couple to the munition housing 150.

Munition 130 further includes a radar module 140. Radar module 140 may be configured to offer precise detection capabilities for various applications, including distance measurement, motion detection, object detect and the like.

Figure 3:
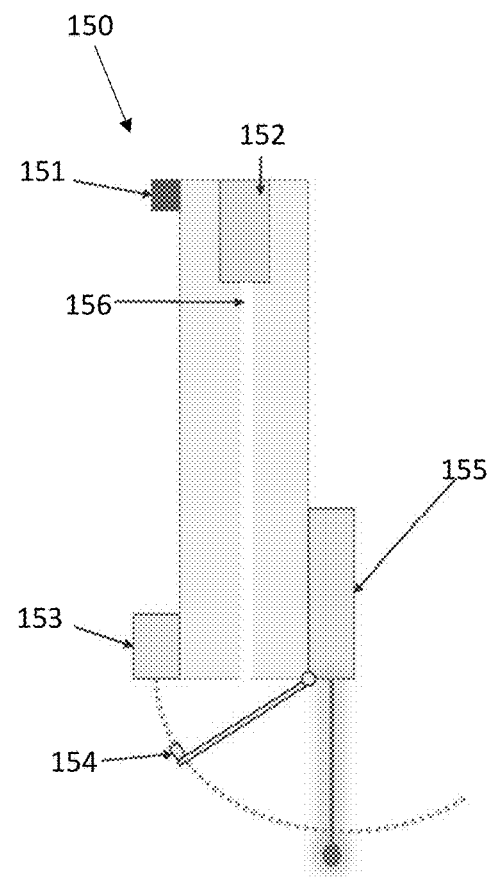
FIG. 3 is a diagram of a munition housing in accordance with an embodiment of the present disclosure.

FIG. 3 illustrates munition housing 150 which may be used with MDAM system 100 shown in FIG. 1. In one embodiment, munition housing 150 comprises a drop tube. Munition housing 150 includes a first connector 151 configured to couple with fire control module 120 (shown in FIGS. 1 and 6). Munition housing 150 includes a second connector 152 configured to couple with munition 130 (shown in FIGS. 1 and 2). For example in one embodiment, second connector 152 of munition housing 150 is configured to be electrical connected to connector 142 of munition 130 (shown in FIGS. 1 and 2). In a further embodiment, second connector 152 of munition housing 150 is configured to be electrically connected to connector 142 of munition 130 (shown in FIGS. 1 and 2) via pin connectors.

Munition housing 150 includes a mechanism for deploying munition. For example, in the embodiment illustrated in FIG. 3, munition housing 150 includes a munition door 154. In one embodiment, munition door 154 is spring loaded. In one embodiment, munition door 154 is configured to be released open via an actuator 153. In one embodiment, actuator 153 comprises a servomotor. A servomotor is a rotary or linear actuator that allows for precise control of angular or linear position, velocity, and acceleration in a mechanical system. It constitutes part of a servomechanism, and consists of a suitable motor coupled to a sensor for position feedback and a controller. However, munition door may be released via other mechanisms known in the art. In one embodiment, munition housing 150 includes one or more aiming mechanisms 155. For example, in one embodiment, aiming mechanism 155 comprises a laser, and more particularly a dual laser. In a further embodiment, the dual laser is configured to emit a first light at a wavelength of 532 nanometers (nm) and 500 mW (e.g., a green laser) and a second light at a wavelength of 830 nm and 25 megawatt (mW) (e.g., an infrared red laser). The laser may enable a user to precisely target enemy assets such as vehicles 102, infrastructure, and personnel.

In one embodiment, munition housing 150 includes one or more slots 156 configured to receive one or more fins 141 of munition 140 (shown in FIGS. 1 and 2).

Figure 4:
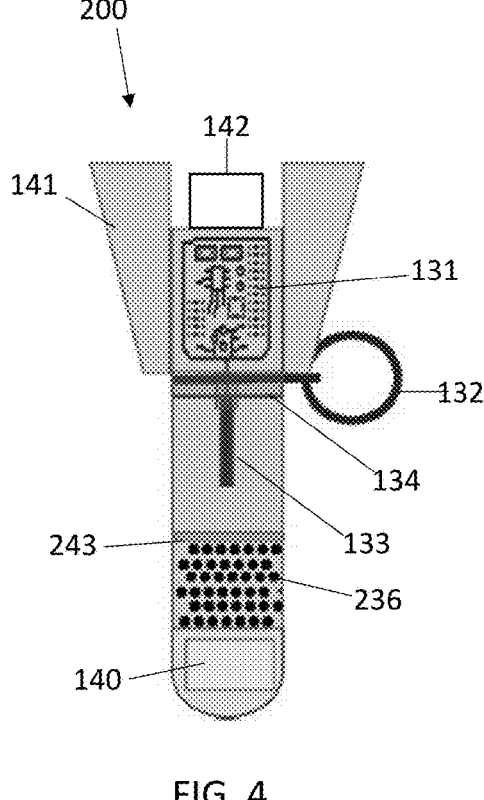
FIG. 4 is a diagram of a munition in accordance with another embodiment of the present disclosure.

FIG. 4 illustrates a munition 200 in accordance with another embodiment of the disclosure. Munition 200 is substantially similar to munition 130 shown in FIG. 2, however it is optimized for airburst. More particularly, munition 200 is equipped with a pusher plate 243 and an explosive core filled with a plurality of ball bearings 236.

Figure 5:
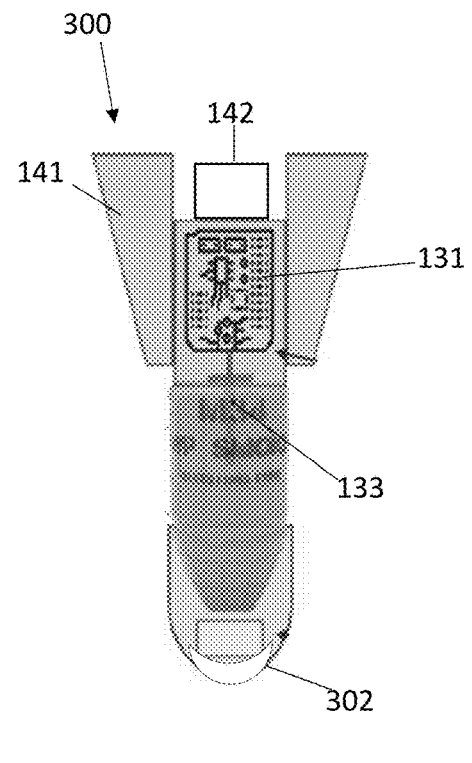
FIG. 5 is a diagram of a munition in accordance with another embodiment of the present disclosure.

FIG. 5 illustrates a munition 300 in accordance with another embodiment of the disclosure. Munition 300 is substantially similar to munition 130 shown in FIG. 2, however microprocessor 131 has electronic firing capability. In a further embodiment, a nose portion of munition 200 includes a windscreen 302.

Figures 6, 7:
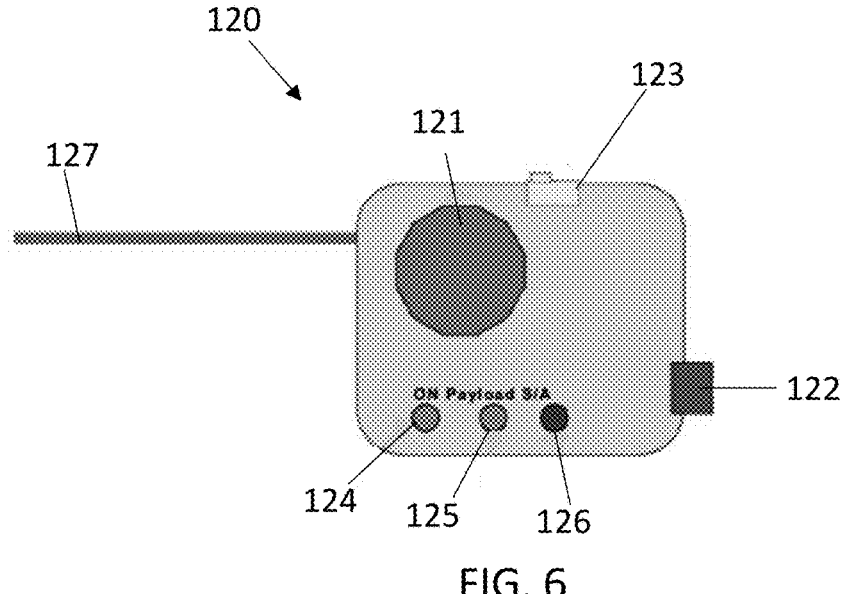
FIG. 6 is a diagram of a fire control module in accordance with an embodiment of the present disclosure.
FIG. 7 is a diagram of a handheld remote in accordance with an embodiment of the present disclosure.

FIG. 6 illustrates fire control module 120 of MDAM system 100 (shown in FIG. 1). Fire control module 120 includes a GNSS and/or GPS antenna 121. The term "GNSS antenna" or "GPS antenna", as used herein, refers generally to a device configured to receive and amplify the radio signals transmitted on specific frequencies by GNSS satellites and convert them to an electronic signal for use by a GNSS and/or GPS receiver. The output of the GNSS and/or GPS antenna is fed into a GNSS and/or GPS receiver that can compute the position. In this way, a location of the drone on which the fire control module 120 is associated with can be accurately determined. In one embodiment, fire control module 120 includes a GNSS and/or GPS safety selector switch 123 for the GNSS and/or GPS. In one embodiment GNSS and/or GPS safety selector switch 123 can toggle between an on and off state.

Fire control module 120 includes a connector 122 configured to couple to the munition housing 150 (shown in FIGS. 1 and 3). In one embodiment, connector 122 of fire control module 120 is configured to couple to first connector 151 of munition housing 150 (shown in FIGS. 1 and 3). In a further embodiment, connector 122 of fire control module 120 is configured to be electrically connected to first connector 151 of munition housing 150 (shown in FIGS. 1 and 3). In a further embodiment, connector 122 of fire control module 120 is configured to be electrically connected to first connector 151 of munition housing 150 (shown in FIGS. 1 and 3) via a pin connector.

In one embodiment, fire control module 120 further includes one or more indicators. For example, in the embodiment shown in FIG. 6, fire control module 120 includes a power indicator 124, a housing connection indicator 125, and a safe/armed indicator 126. The one or more indicators may comprise LEDs with different colors indicating different statuses. For example, power indicator 124 may be configured to display a first color (e.g., orange) indicating fire control module 120 is on, but there is no connection, and a second color (e.g., green) indicating fire control module 120 is on, and the connection is good.

Housing connection indicator 125 may be configured to display a first color (e.g., red) when fire control module 120 is not connected to a munition housing, a second color (e.g., orange) when fire control module is connected to a munition housing but no munition is detected, and a third color (e.g., green) when fire control module 120 is connected to a munition housing and a munition is detected. Safe/armed indicator 126 may be configured to display a first color (e.g., green) when the respective drone is unarmed and a second color (e.g., red) when the drone is armed.

Fire control module 127 further comprises a communication antenna 127 for transmitting and/or receiving signals.

FIG. 7 illustrates remote controller 160 of MDAM system 100 (shown in FIG. 1). In one embodiment, remote controller 160 is a handheld remote. Remote controller 160 includes a GNSS and/or GPS antenna 161. In one embodiment, remote controller 160 includes a communication antenna 162 configured to transmit and receive signals. In one embodiment, communication antenna 162 comprises a long-range communication antenna.

Remote controller 160 includes one or more release buttons 163. In one embodiment, the one or more release buttons 163 are configured to release a munition from a munition housing. In one embodiment, the one or more release buttons 162 comprise a plurality of release buttons (e.g., two release buttons) that must be pressed at the same time in order for the munition to be released from munition housing.

In one embodiment, remote controller 160 incudes a laser firing button 164. Pressing laser firing button 164 activates a remote laser (e.g., laser on munition housing 150). In one embodiment, remote controller 160 further includes a laser mode selector switch 165. Laser mode selector switch 165 enabling a user to switch between two or more different laser types (e.g., an infrared red laser and a green visible laser).

In one embodiment, remote controller 160 includes a firing mode selector switch 166. Firing mode selector switch enables a user to select a firing mode. Example firing modes include, but are not limited to, point detonating (impact), air burst (3 m), and/or air burst (7 m).

In one embodiment, remote controller 160 includes a safe/arm button 167 which enables a user to arm and disarm a drone (e.g., drone 110 shown in FIG. 1). For example, in one embodiment, safe/arm button 167 is configured to arm or disarm a drone when pressed for a predetermined time period (e.g., 3 seconds). In one embodiment, remote controller 160 includes a cover 168 configured to cover safe/arm button 167 to prevent accidental arming and/or disarming of the drone. In one embodiment, cover 168 is a flip-up cover.

In one embodiment, remote controller 160 includes one or more indicators. For example, in the embodiment illustrated in FIG. 7, remote controller 160 includes a power indicator 169, a safe to arm indicator 170, and a safe/armed 171 indicator. The one or more indicators may comprise LEDs with different colors indicating different statuses. For example, power indicator 169 may be configured to display a first color (e.g., orange) indicating remote controller 160 is on, but there is no connection, and a second color (e.g., green) indicating remote controller 160 is on and connected to a drone (e.g., drone 110 in FIG. 1). Safe to arm indicator 170 may be configured to display a first color (e.g., green) when one or more predetermined conditions are met indicating it is safe to arm the drone, and a second color (e.g., orange) when one or more predetermined conditions are not met indicating it is not safe to arm. Safe/armed indicator 126 may be configured to display a first color (e.g., green) when the respective drone is unarmed and a second color (e.g., red) when the drone is armed.

Figure 8:
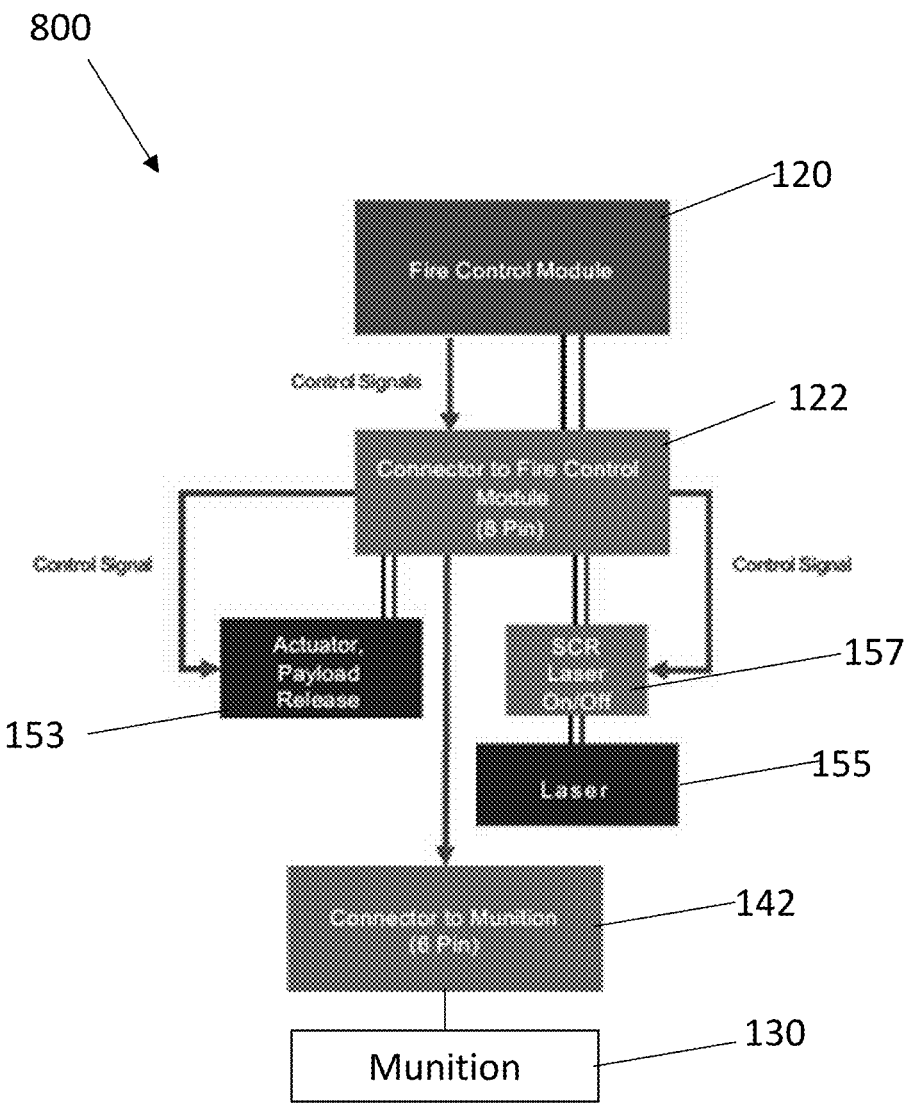
FIG. 8 is a block diagram of electrical components of a munition housing in accordance with an embodiment of the present disclosure.

FIG. 8 is a block diagram 800 illustrating electrical components and connections of MDAM system 100 (shown in FIG. 1). More particularly, FIG. 8 shows connections between components of fire control module 120, components of munition 140, and components of munition housing 150. More particularly, fire control module 120 sends control signals to connector 122 of fire control module 120. Connector 122 of fire control module 120 may be communicatively coupled to each of actuator 152 of munition housing 150, laser 155 of munition housing, and connector 142 of munition 130 via wired or wireless connection. Laser 155 may include a switch 157 configured to turn laser 155 on and off.

Figure 9:
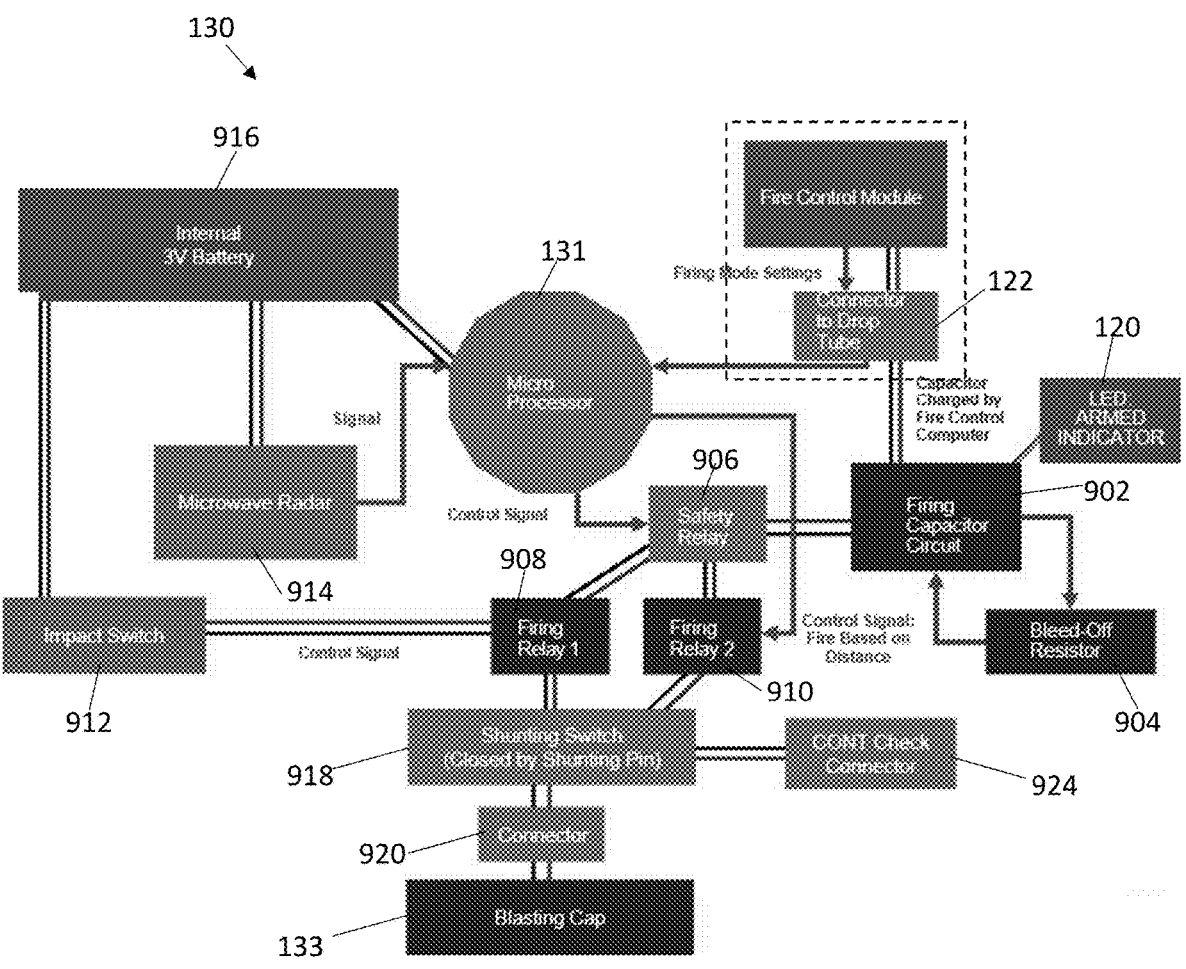
FIG. 9 is a block diagram of electrical components of a munition in accordance with an embodiment of the present disclosure.

FIG. 9 is a block diagram of electrical components of munition 130. Fire control module 120 is configured to transmit firing mode settings to connector 122 which relays this information to microprocessor 131. One or more electrical components of munition 130 is powered by an internal battery 916.

In one embodiment, munition 140 includes a firing capacitor circuit 902 configured to provide power to one or more components of munition 140 and a bleed-off resistor 904.

Microprocessor 131 is configured to send one or more control signals to a safety relay 906. Safety relay 906 is normally open and is configured to be closed by microprocessor 131 when it detects that the connector 122 is no longer coupled to munition housing 150. Munition 140 further includes one or more firing relays. For example, in the embodiment illustrated in FIG. 9, munition 140 includes a first firing relay 908 and a second firing relay 910. First firing relay 908 may be controlled by an impact switch 912. First firing relay 908 is independent from microcontroller 131 and serves as a fail-safe if the air burst feature fails to work. In one embodiment, second firing relay 910 may be controlled by microcontroller 131. Microcontroller 131 may send a control signal based on input from one or more sensors compared to settings that have been relayed via fire control module 120. For example, in one embodiment, microprocessor 131 is communicatively coupled to a radio detecting and ranging (radar) module 914 (e.g., microwave radar, lidar, etc.), one or more distance sensors, one or more cameras, or the like. In one embodiment, microprocessor 131 transmits a control signal to second firing relay 910 based on a distance. For example, in one embodiment, microprocessor 131 determines a location of a drone based on GPS data and compares the location of the drone to a target area or perimeter, and transmits a control signal to second firing relay 910 if the drone is within a target area or perimeter. The location settings may be configured by a user and transmitted to microcontroller 131 via a communication link.

Munition 140 further includes a shunting switch 918. Shunting switch 918 is configured to be closed by shunting pin 132 (shown in FIG. 1). Munition 140 further includes blasting cap 133 connected to shunting switch 918 via a connector 920. In one embodiment, munition 140 further includes a continuity check connector 924 configured to enable a user to plug continuity check leads to check blasting cap 133 continuity.

Figure 10:
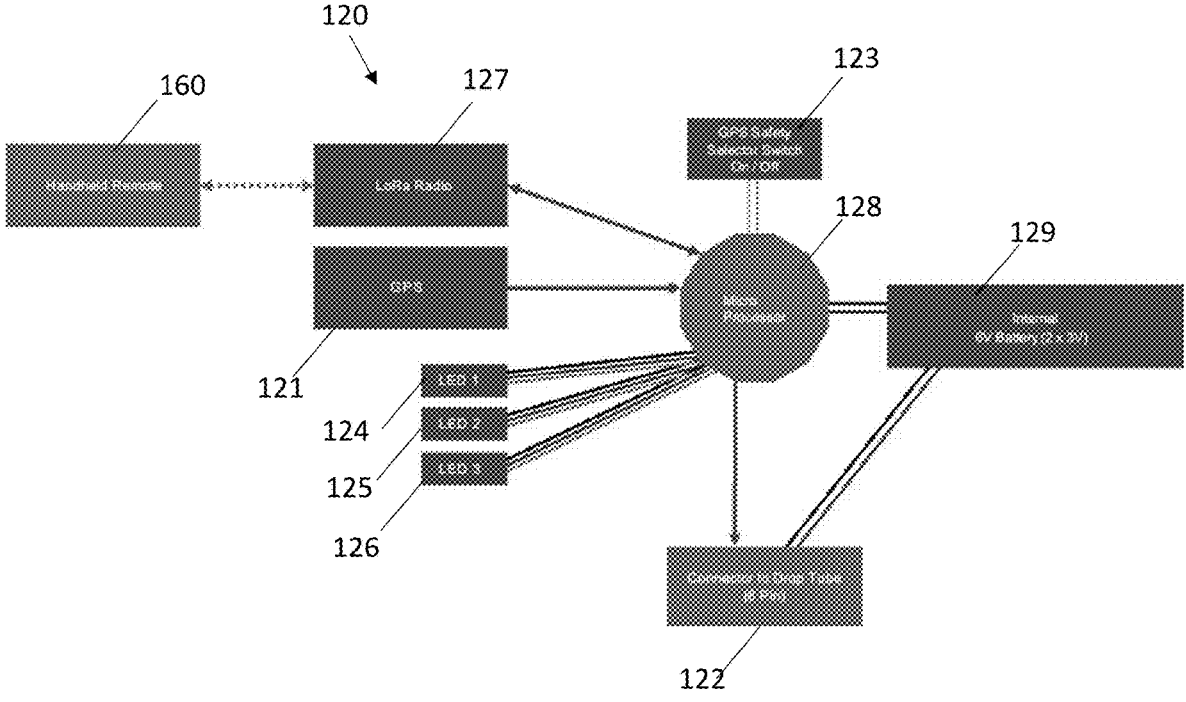
FIG. 10 is a block diagram of electrical components of a fire control module in accordance with an embodiment of the present disclosure.

FIG. 10 is a block diagram of electrical components of fire control module 120. Fire control module 120 includes GNSS or GPS antenna 121 and safety selector switch 123 (e.g., a GNSS or GPS safety selector switch). Fire control module further includes connector 122 configured to couple with munition housing 150. In one embodiment, fire control module further includes one or more indicators, such as LED indicators 124, 125, 126.

Fire control module 120 further includes communication antenna 127. Communication antenna 127 enables fire control module 120 to communicate with remote controller 160. In one embodiment, communication antenna 127 comprises a long-range communication antenna.

Fire control module 120 includes a microprocessor 128 and an internal battery 129 configured to power one or more components of fire control module 120. Microprocessor 128 may be communicatively coupled to each of communication antenna 127, GNSS or GPS antenna 121, safety selector switch 123, one or more indicators (e.g., LED indicators 124, 125, 126), connector 122, and/or internal battery 129 via a wired and/or wireless connections.

Microprocessor 128 receives firing mode settings from a control center via a communication link, such as one or more radio frequency links or wireless communication channels, including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection. For example, in one embodiment, operators program the firing mode settings, such as the launch trajectory, desired impact point, and timing of the detonation, and these firing mode settings are transmitted to fire control module 120. Fire control module 120 can relay the firing mode settings to munition 130.

Figure 11:
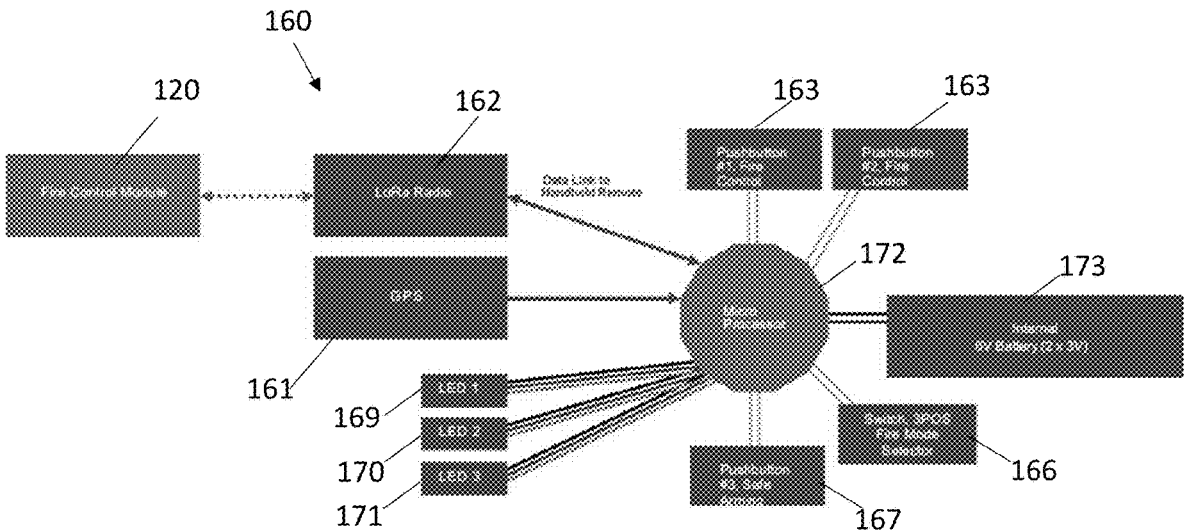
FIG. 11 is a block diagram of electrical components of a handheld remote in accordance with an embodiment of the present disclosure.

FIG. 11 is a block diagram of electrical components of remote controller 160. Remote controller 160 includes one or more release buttons 163. In one embodiment, the one or more release buttons 163 are configured to release a munition from a munition housing. In one embodiment, the one or more release buttons 163 comprise a plurality of release buttons (e.g., two release buttons) that must be pressed at the same time in order for the munition to be released from munition housing.

Remote controller 160 further includes firing mode selector switch 166. Firing mode selector switch enables a user to select a firing mode. Example firing modes include, but are not limited to, point detonating (impact), air burst (3 m), and/or air burst (7 m).

Remote controller 160 further includes safe/arm button 167 which enables a user to arm and disarm a drone (e.g., drone 110 shown in FIG. 1). For example, in one embodiment, safe/arm button 167 is configured to arm or disarm a drone when pressed for a predetermined time period (e.g., 3 seconds).

Remote controller further 160 further includes one or more indicators, such as LED indicators 169, 170, and 171.

Remote controller 160 includes a GNSS or GPS antenna 161. Remote controller includes a communication antenna 162. Communication antenna 162 enables remote controller 160 to communicate with fire control module 120. In one embodiment, communication antenna 162 comprises a long-range communication antenna.

Remote controller 160 includes a microprocessor 172 and an internal battery 173 for powering one or more components of remote controller 160. Microprocessor 172 may be communicatively coupled to each of communication antenna 162, GNSS or GPS antenna 161, one or more indicators (e.g., LED indicators 169, 170, 171), one or more release buttons 163, firing mode selector switch 166, safe/arm button 167, and/or internal battery 173 via a wired and/or wireless connection.

Figure 12:
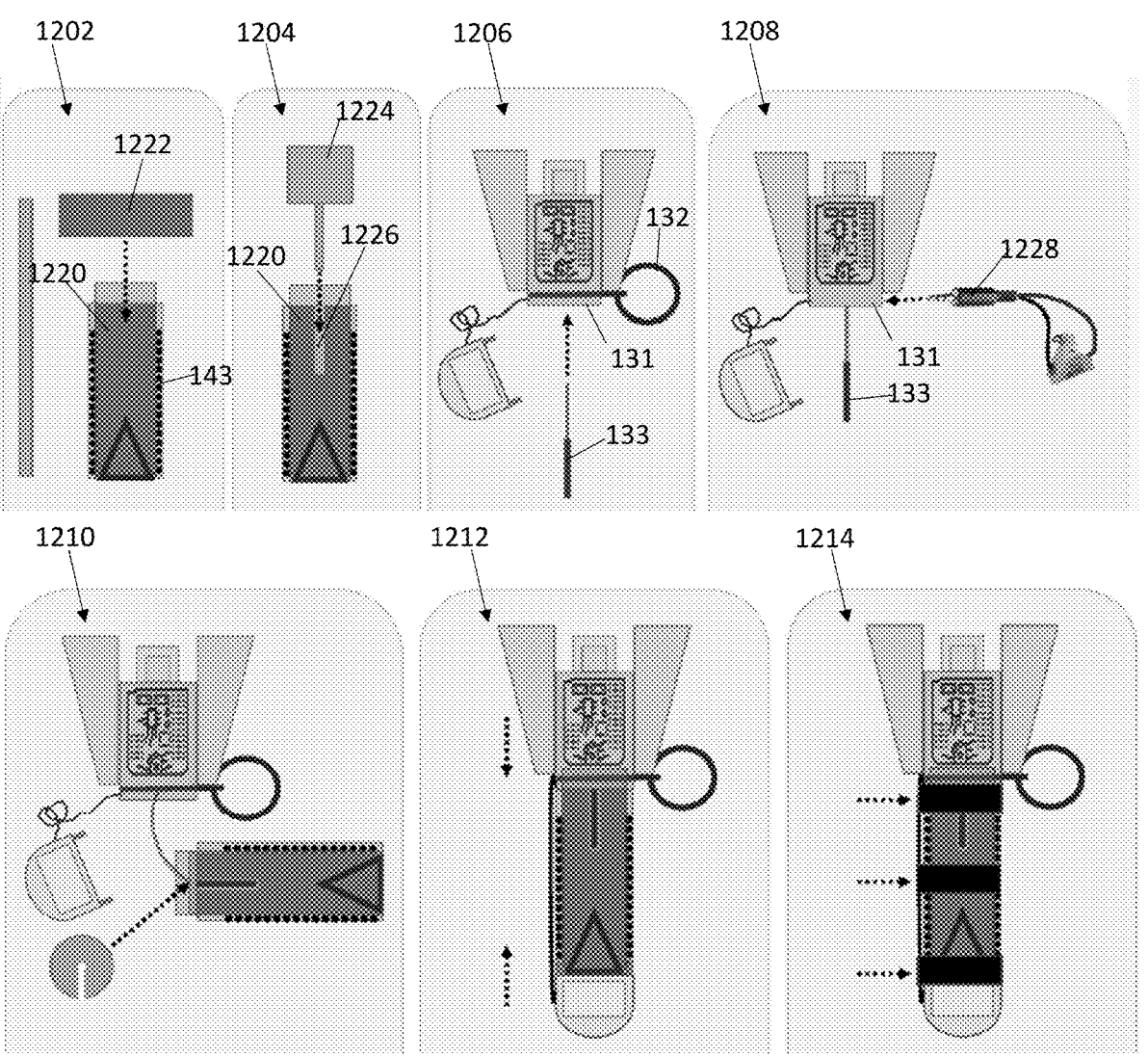
FIG. 12 is a diagram of a process for building a munition in accordance with an embodiment of the present disclosure.

FIG. 12 show a process for building a munition (e.g., munition 130 shown in FIGS. 1 and 2). At 1202, energetic 1220 is packed into a body 143 of munition using a packing rod 1222 or other method known in the art. At 1204, a hole 1226 is punched in the energetic 1220 using a punch tool 1224 or other method known in the art. Hole 1226 is configured to receive blasting cap 133 of munition 130.

At 1206, leads of blasting cap 133 are secured in a receptacle of microprocessor 131. At 1208 shunting pin 132 is removed and a continuity test lead assembly 1228 is inserted and used to test continuity. After testing, continuity test lead assembly 1228 is removed and shunting pin 132 is inserted.

At 1210, blasting cap 133 is inserted into body 143 of munition and cap retention disk 134 is installed. At 1212, body 143 of munition, nose 137, and tail assembly (e.g., microprocessor 131 and fins 141) are joined together. At 1214, joints and cable are secured using friction tape, or any other bonding material/mechanism (e.g., other tape, glue, and the like).

Figure 13:
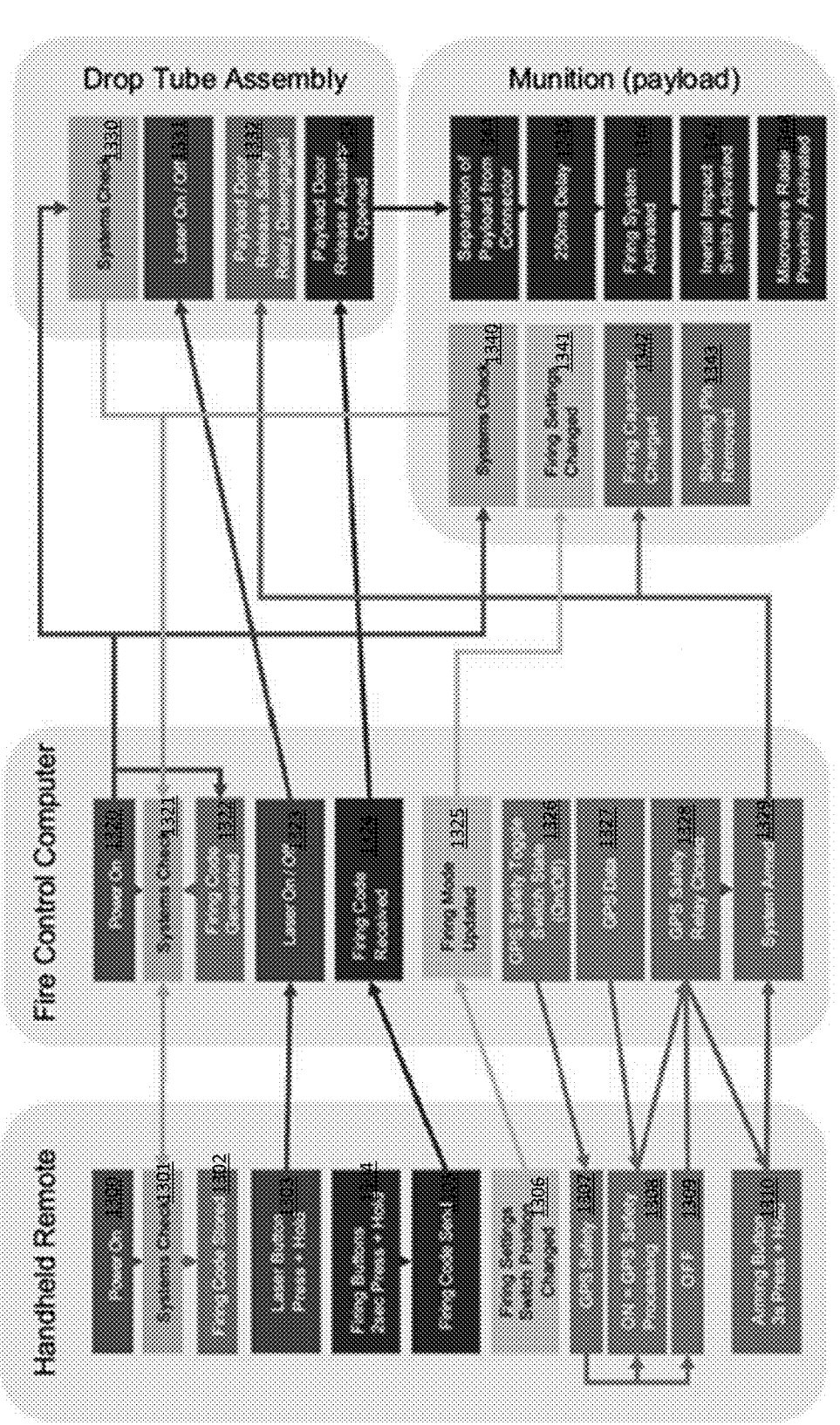
FIG. 13 is a flow diagram of processes of an MDAM system in accordance with an embodiment of the present disclosure.

FIG. 13 is a flow chart of processes of MDAM system 100 (shown in FIG. 1). Handheld remote first powers on at 1301 and then performs a systems check at 1302. Similarly fire control computer powers on at 1320 and performs a systems check at 1321. Munition housing performs at systems check 1330 and munition performs at systems check at 1340. In one embodiment, remote controller, munition housing, and munition sends control signals indicating a status of their respective systems check to fire control computer.

If a button on the remote controller corresponding to the laser is pressed by a user at 1303, fire control computer sends one or more control signals at 1323 which cause the laser on the munition housing to turn on or off at 1331.

If one or more buttons on the remote controller corresponding to firing are pressed by a user at 1304, a firing code is transmitted by remote to fire control computer at 1305. In one embodiment, the firing code is encrypted. Fire control computer receives the firing code at 1324. Fire control computer then sends a control signal to munition housing which causes munition housing door release actuator to open at 1333. This then causes separation of the munition from the connector at 1344, after a predetermined time period elapses at 1345 (e.g., 250 ms), the firing system to activate at 1346, an inertial impact switch to be activated 1347, and a radar to be proximately activated at 1348.

If the firing settings switch position is changed on remote controller at 1306, then a control signal is sent to fire control computer which causes firing mode to be updated at 1325. Fire control computer then sends a control signal to munition causing the firing settings of munition to be changed at 1341. The shunting pin is them removed from munition at 1343. This may be performed manually or automatically.

The firing code is generated by the firing control computer at 1322 and stored by handheld remote at 1302. The firing capacitor on the munition is charged at 1342 and the munition housing door release safety relay is disengaged at 1332.

If a safety switch is toggled to another state (e.g., on or off) on fire control computer at 1326, GPS safety on remote controller sends one or more control messages at 1307, causing GPS safety processing to turn on at 1308 or GPS safety processing to turn off at 1309. If GPS safety processing is turned on, fire control computer sends GPS data 1327 to remote controller at 1308 and remote controller sends a control signal to fire control computer causing fire control computer to close GPS safety relay at 1328. If GPS safety processing is turned off.

If GPS safety relay is closed and an arming button on remote controller is pressed by a user at 1310, the fire control computer arms the system at 1329.

It is appreciated that the exemplary system of the attached figures is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

The invention claimed is:

1. A system for delivering ordinance, comprising:
a flight capable drone having a lift capacity suitable for carrying a munition and a munition housing configured to receive the munition;
a fire control module in communication with the munition; and
a handheld device in remote communication with the fire control module;
wherein at least one encrypted firing code generated by the fire control module is received by the handheld device;

wherein the munition is configured to be armed in accordance with at least a location of the drone; and
wherein the munition includes a microprocessor and a safety relay, wherein the safety relay is normally open and the microprocessor is configured to close the safety relay when the munition disconnects from the munition housing.

2. The system of claim 1, wherein the munition housing includes a door configured to be opened via one or more actuators.

3. The system of claim 2, wherein the handheld device includes one or more firing buttons, wherein when the one or more firing buttons are pressed, a first control signal is transmitted from handheld remote to fire control module and a second control signal is transmitted to munition housing, wherein the second control signal causes the door of munition housing to open.

4. The system of claim 1, wherein the munition is configured to be armed when the location of the drone is within a predetermined perimeter.

5. The system of claim 1, wherein the munition further includes a radar module configured to detect one or more objects.

6. The system of claim 1, wherein the munition is configured to be armed when one or more objects are detected.

7. The system of claim 1, wherein the munition further includes an impact switch configured to sense an impact, shock, or abrupt force.

8. The system of claim 7, wherein, on a condition the impact switch is activated, the impact switch is configured to trigger a fail safe mode.

9. The system of claim 1 wherein the fire control module and munition housing are connected via a first connector.

10. The system of claim 9, wherein the munition housing and the munition are connected via a second connector.

11. The system of claim 1, the munition housing including a laser for aiming.

12. The system of claim 11, wherein the laser is configured to be activated in response to an input from the handheld remote.

13. The system of claim 1, wherein the munition is further configured to be armed in response to an input from the handheld remote.

14. The system of claim 1, wherein the handheld remote includes a firing mode selector switch, wherein, in response to a position of the firing mode selector switch changing, transmitting updated firing mode data to the fire control module.

15. The system of claim 14, wherein the fire control module is configured to, in response to receiving updated firing mode data, transmit the updated firing mode data to munition.

\* \* \* \* \*